US006461727B1

(12) United States Patent
Lauer et al.

(10) Patent No.: US 6,461,727 B1
(45) Date of Patent: Oct. 8, 2002

(54) MEAT LABEL

(75) Inventors: Bernd Lauer, Ennepetal; Kerstin Pape, Leverkusen; Sabine Ziegler, Bad Soden/Salmünster, all of (DE)

(73) Assignee: Jackstadt GmbH, Wuppertal (DE)

( * ) Notice: Subject to any disclaimer, the term of this patent is extended or adjusted under 35 U.S.C. 154(b) by 0 days.

(21) Appl. No.: 09/435,810

(22) Filed: Nov. 8, 1999

(30) Foreign Application Priority Data

Nov. 6, 1998 (DE) ........................................ 198 51 122
Nov. 17, 1998 (DE) ........................................ 198 53 016

(51) Int. Cl.7 ............................ B32B 7/14; B32B 15/04
(52) U.S. Cl. ........................ 428/343; 428/194; 428/355
(58) Field of Search ................................ 428/194, 343, 428/355

(56) References Cited

U.S. PATENT DOCUMENTS 2,510,120 A * 6/1950 Leander

FOREIGN PATENT DOCUMENTS

| | | |
|---|---|---|
| DE | 44 33 006 | 3/1996 |
| EP | 0 510 403 | 10/1992 |
| GB | 2142557 A * | 1/1985 |

* cited by examiner

*Primary Examiner*—Daniel Zirker
*Assistant Examiner*—Victor Chang
(74) *Attorney, Agent, or Firm*—Nixon Peabody LLP; David S. Safran

(57) ABSTRACT

A label (1) to be applied to meat, with a paper layer (2) which has a front (3) which can be printed or written upon. To make a label (1) which sticks or adheres to both wet and dry spots on the meat and which can be easily removed again, on the back (4) of the paper layer (2) there is at least one area (7) with adhesive (6) and at least one area without adhesive (8).

17 Claims, 1 Drawing Sheet

MEAT LABEL

BACKGROUND OF THE INVENTION

1. Field of the Invention

The invention relates to a label to be applied to meat, with a surface material which is absorbent and with a front which can be printed or written upon.

2. Description of Related Art

Cattle, hogs and other animals for slaughter generally have a mark attached to the ear of the each animal on which certain information about the origin, age, breeder and optionally other information can be found. After the animals are slaughtered, it is necessary for documentary purposes to apply this information and other information to the cut pieces of meat. For this reason, at the time of slaughter, the veterinarian or butcher writes the required information on a label consisting solely of paper or a label completely coated with adhesive, and then presses it directly onto one spot on the meat. In doing so, the uncoated label forms a connection to the wet meat and adheres. A label completely coated with adhesive, on the other hand, adheres to dry spots, but does not adequately adhere to wet and greasy spots and can fall off.

The problem in the known process for application of the paper label is that the known label can only be removed again with difficulty after application and drying on the meat. If the known label remains for a longer time on wet meat, the paper softens, and also for this reason, can only be poorly removed. Generally, in an attempt to remove the known label from the meat, residue of the outline remains on the meat, which must then be cut off. This is not only labor-intensive and time-consuming, but also means a loss of meat. Another disadvantage of the known label of pure paper is that it cannot be glued to dry spots on the meat.

SUMMARY OF THE INVENTION

The object of this invention is therefore to make available a label for application to meat which is suitable for all applications and which can be both easily applied and also easily removed again.

This object is achieved as in accordance with the invention in that a label of the initially mentioned type is provided with a layer on the back of the top material, which can preferably be paper, this layer having at least one area with adhesive and at least one area without adhesive. The embodiment of the label according to the invention using at least one zone coated with adhesive and one zone without adhesive offers the advantage that the label of the invention can be applied both to wet and also dry spots on the meat since the area without adhesive adheres or sticks to wet spots on the meat, while the area coated with adhesive sticks to dry spots, for example, muscle meat.

In addition, the label in accordance with the present invention does not soften as quickly as the known paper label, if it has been applied to a wet piece of meat. The lower tendency of the inventive label is provided by the adhesive which is used as a type of protective layer for the paper of the paper layer on the spots on the label where it is applied to the paper layer. Finally, it has been ascertained that a label as according to the invention can be more easily detached or removed again from a piece of meat. This advantage ultimately arises from the fact that the entire paper layer does not stick or adhere to the meat in the label of the invention due to the different areas, regardless of the application, but only a partial area does so, the other partial area which does not stick can, accordingly, be easily removed. It should be pointed out here that the terms "stick" and "adhere" are used interchangeably here.

Although it is fundamentally possible for the adhesive layer to have only one single area with adhesive and one single area without adhesive, it has been shown in tests that to ensure a reliable adhesive or cement connection, it is advantageous for the adhesive layer to have a plurality of areas with adhesive and likewise a plurality of areas without adhesive. In this connection, for reasons of production engineering it is a good idea if there are areas with adhesive and areas without adhesive in a regular pattern on the paper layer.

In one preferred embodiment of the invention which can be very easily implemented otherwise by production engineering, the areas with adhesive and the areas without adhesive are made strip-shaped and especially as chevron-shaped strips. To achieve good adhesive and sticking results, it is furthermore provided that the strips with areas with adhesive and the areas without adhesive are located next to one another and in alternation.

In tests which have been run, moreover, it has been ascertained that, to achieve good adhesive and sticking results in the labeling of meat, both of wet and greasy, and also dry zones of meat, it is advantageous to make the width of the strips of the areas with adhesive and the width of the areas without adhesive approximately the same. In doing so, it has been found that the width of the strips can be between 1 and 80 mm, but preferably between 10 and 30 mm.

For reasons of production engineering, it is a good idea for the paper to have a roughly rectangular shape, the strips then running lengthwise or transversely to the rectangular shape.

Especially an oil-proof or grease-proof paper which does not soften when applied to the meat or which does so only slowly is suited as the paper of the paper layer, while a food compatible dispersion cement or a solvent cement should be used as the adhesive for the special application of labeling meat.

Finally, the label in accordance with the invention, preferably, has a removable protective and carrying layer which is applied to the adhesive layer. The protective and carrying layer is used not only to protect the adhesive layer, but also as a carrier of the paper layer, in order to be able to transport and print the label according to the invention in a printer.

Other features will become apparent from the following description of embodiments using the drawings.

DETAILED DESCRIPTION OF THE INVENTION

Figure 1:
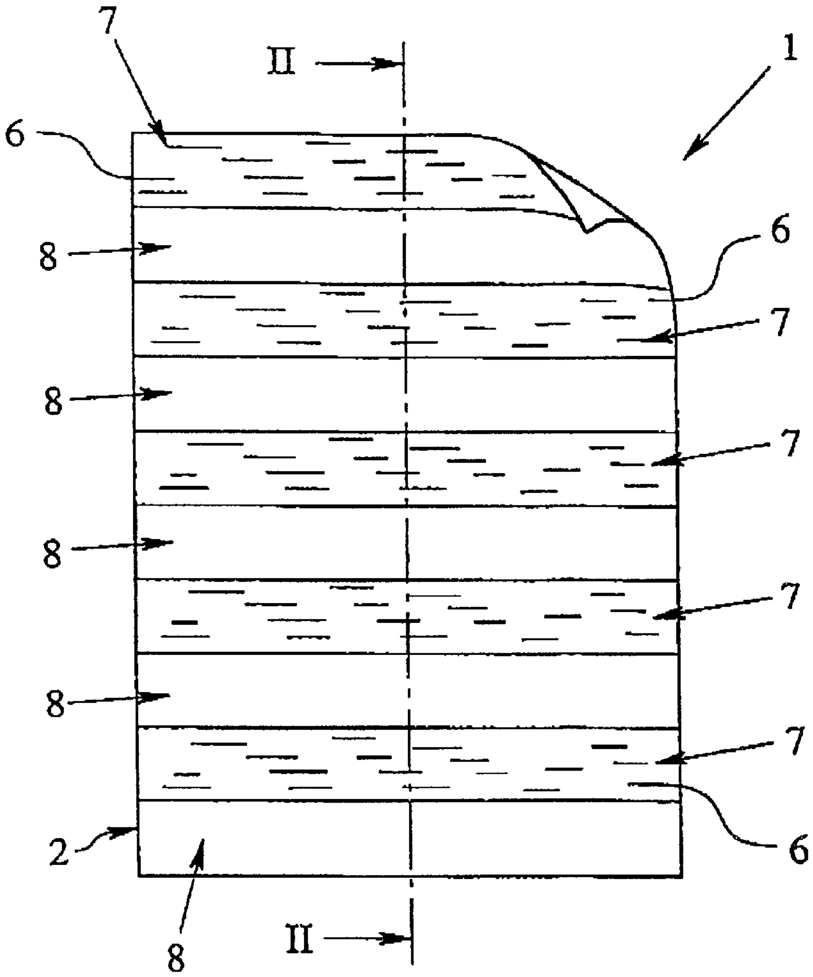
FIG. 1 is an overhead view of a label in accordance with a preferred embodiment of the invention with a protective and carrying layer removed.
Figure 2:
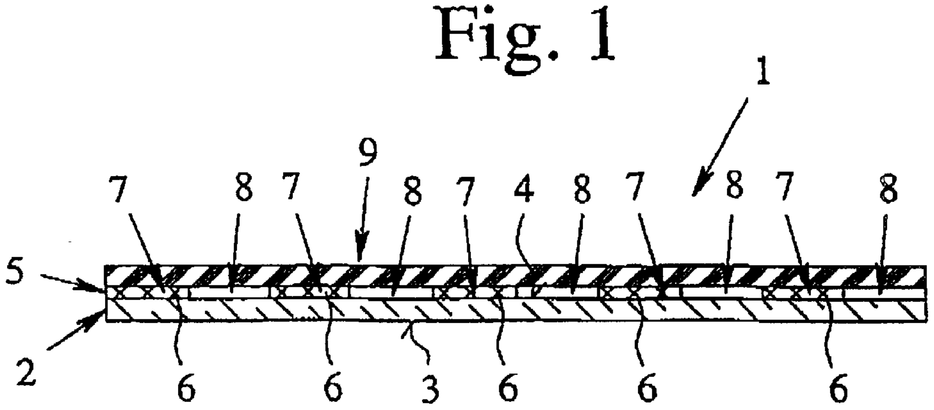
FIG. 2 is a cross-sectional view of the label from FIG. 1 taken along line II—II, but with the protective and carrying layer applied.

In the figures, a label 1 is shown which is used for direct labeling of meat, i.e., for direct application to a piece of meat. The label 1 has a paper layer 2, as an absorbent surface material, with a front 3 which can be printed or written upon so that information about the origin and the age of the meat can be applied to the front 3 of the paper layer 2 by hand or by a printer.

At this point it is important that on the back 4 of the paper layer 2 there is a backing layer 5 with an adhesive 6. It is essential that the adhesive 6 on the backing layer 5 does not cover the entire area of the label by rather is only in at least one area 7, there being at least one area 8 that is without adhesive. The area(s) 7 with the adhesive 6 is(are) used to affix label 1 to dry spots on the meat, such as muscle meat, while this area 7 does not stick or adhere to wet spots on the meat. Conversely, the adhesive-free areas 8 stick or adhere to wet or greasy spots on the meat, while these regions 8 do not adhere to dry spots on the meat.

In this embodiment, the label 1 has five areas 7 with adhesive 6 and also five areas 8 without adhesive, but it is pointed out that the number of areas 7 with adhesive 6 and areas 8 without adhesive need not be identical nor is any particular number of areas required. The areas 7 with adhesive 6 and the areas 8 without adhesive are arranged in a regular pattern on the paper layer 2, and preferably, as is apparent in the embodiment shown, as bar-shaped strips, which are located next to one another in an alternating pattern. The individual strips of areas 7 with adhesive 6 are all the same size, having the same length and width. The same applies to the strips of the areas 8 without adhesive. Otherwise, the width of the strips of the areas 7 with adhesive 6 also corresponds roughly to the width of the areas 8 without adhesive.

The width of the individual strips of the areas 7 with adhesive 6 and areas 8 without adhesive, is among other things, dependent on the size of the label 1, which generally has a rectangular shape, as is shown in FIG. 1, and the corners can be rounded. The width of the strips in the embodiment shown is roughly 12 mm, so that for ten strips, the length of this label is roughly 12 cm, with a width of roughly 8.5 cm. It goes without saying that the label 1 can also be larger or smaller. In the embodiment shown, the strips of areas 7, 8 run transversely to the long side of the rectangular shape and extend over the entire width of the label 1.

The paper material of the paper layer 2, here, is an oil-proof and grease-proof material while the adhesive 6 is a food-compatible, dispersion adhesive. Use of other food-compatible adhesives, such as for example, solvent-based adhesives, is possible.

On the back, a removable protective and carrying layer 9 with a silicone coating is applied to the adhesive layer 5. The protective and carrying layer 9, on the one hand, performs a protective function for the adhesive layer 5. On the other hand, the protective and carrying layer 9 is also used as a carrier of the paper layer 2, especially so that the label 1 can be printed using a printer.

We Claim:

1. A meat label for application to a meat product, comprising an absorbent surface material which has a front side adapted to enable printing and writing thereon, and a rear side which has a plurality of areas with a food compatible adhesive and a plurality of areas which are free of said adhesive, wherein an area which is free from said adhesive lies between two areas with said adhesive, and the areas which are free from adhesive are adherant to wet areas of the surface of the meat product, and the areas with said adhesive are adherent to dry areas of the surface of the meat product.

2. The label as claimed in claim 1, wherein the absorbent surface material is a sheet of paper.

3. The label as claimed in claim 2, wherein the areas with adhesive and the areas that are free of adhesive are arranged in a regular pattern on the paper layer.

4. The label as claimed in claim 3, wherein the areas with adhesive and the areas without adhesive are made bar-shaped.

5. The label as claimed in claim 4, wherein the areas with adhesive and the areas that are free of adhesive are located next to one another in an alternating pattern.

6. The label as claimed in claim 5, wherein the areas with adhesive and the areas without adhesive extend completely across the label.

7. The label as claimed in claim 4, wherein the areas with adhesive have a width which corresponds to roughly that of the areas that are free of adhesive.

8. The label as claimed in claim 4, wherein the areas with adhesive and the areas which are free of adhesive have a width between 1 and 80 mm.

9. The label as claimed in claim 4, wherein the areas with adhesive and the areas which are free of adhesive have a width between 10 and 30 mm.

10. The label as claimed in claim 4, wherein the label has a roughly rectangular shape; and wherein the areas with adhesive and the areas that are free of adhesive run parallel to a pair of sides of the rectangular shape.

11. The label as claimed in claim 2, wherein the paper of the paper layer is selected from the group consisting of oil-proof and grease-proof papers.

12. The label as claimed in claim 1, wherein the adhesive is selected from the group consisting of dispersion cements and solvent cements.

13. The label as claimed in claim 1, wherein the adhesive is covered by a removable protective or carrying layer.

14. The label as claimed in claim 1, wherein the areas with adhesive and the areas that are free of adhesive are bar-shaped.

15. The label as claimed in claim 14, wherein the areas with adhesive and the areas that are free of adhesive are located next to one another in an alternating pattern.

16. The label as claimed in claim 14, wherein the areas with adhesive and the areas that are free of adhesive extend completely across the label.

17. The label as claimed in claim 14, wherein the areas with adhesive have a width which corresponds to roughly that of the areas that are free of adhesive.

* * * * *